United States Patent [19]
Coleman

[11] 3,932,177
[45] Jan. 13, 1976

[54] METHOD FOR FORMING A COLLAR

[75] Inventor: Raymond C. Coleman, Webster, N.Y.

[73] Assignee: Xerox Corporation

[22] Filed: Aug. 30, 1974

[21] Appl. No.: 502,081

Related U.S. Application Data

[62] Division of Ser. No. 290,445, Sept. 20, 1972, Pat. No. 3,851,985.

[52] U.S. Cl. .................... 75/214; 75/200; 75/226
[51] Int. Cl.² ........................................ B22F 5/00
[58] Field of Search .................. 75/214, 226, 200

[56] References Cited
UNITED STATES PATENTS

| | | | |
|---|---|---|---|
| 2,558,823 | 4/1951 | Crowley et al. | 75/214 X |
| 3,429,700 | 2/1969 | Wiegand et al. | 29/420 X |
| 3,600,013 | 8/1971 | Deering | 287/52.08 |

*Primary Examiner*—Benjamin R. Padgett
*Assistant Examiner*—E. Suzanne Parr
*Attorney, Agent, or Firm*—Hill, Gross, Simpson, Van Santen, Steadman, Chiara & Simpson

[57] ABSTRACT

An article such as a collar having a setscrew for enabling securing the collar on a shaft member which is telescopically received in an opening of the collar characterized by the collar having a pair of cavities with one cavity in communication with the opening and extending from one end and the other cavity extending from the opposite end and in communication with an outer surface of the collar. Each of the cavities terminates in a partial annular threaded segment which segment coacts to form an opening having interrupted threads to receive a setscrew. The threads on each of the annular segments extends transversely to a direction of application of pressure when forming the collar such as by compacting metal powder which is subsequently sintered.

4 Claims, 6 Drawing Figures

METHOD FOR FORMING A COLLAR

This is a division of application Ser. No. 290,445, filed Sept. 20, 1972, now U.S. Pat. No. 3,851,985.

BACKGROUND OF THE DISCLOSURE

1. Field of the Invention

The present invention is directed to an article such as a collar having a setscrew opening and to the method of making the article.

2. Prior Art

In many instances, collars having setscrews are utilized on shafts to either locate the shaft in a supporting structure or to maintain a critical position of a part carried by the shaft. At the present time, collars are usually cut from bar stock and the setscrew hole is formed by drilling and tapping operations. This method of forming a collar or other articles requires expensive machining processes which increase the cost of the article.

To provide an article which can be held onto a shaft by a setscrew without requiring expensive drilling and tapping operations, it has been suggested to form the article as a block member with a groove having a partial annular section of threads which threads cooperate with a retaining clip subsequently assembled on the block to complete the setscrew hole. An example of this article is disclosed in U.S. Pat. No. 3,600,013 which issued to J. P. Doering on Aug. 17, 1971. While the structure of this article removes the need for expensive steps of drilling and tapping a setscrew hole, it requires an additional step of assemblying the clip onto the body of the article to complete the setscrew hole.

In the powder metallurgy art, several processes have been utilized to form complex structures, for example a valve sleeve which has ports and is disclosed in U.S. Pat. No. 3,353,249 which issued to MacFarlane et al. on Nov. 21, 1967 or a pulley wheel which has helical teeth and is disclosed in the U.S. Pat. No. 3,429,700 which issued to Wiegand et al. on Feb. 25, 1969. In both of these processes, the final article is subdivided into components which are formed by compacting metal powders with a subsequent sintering operation and then the subcomponents are joined together by a bonding process to complete the article. While the process disclosed in both of these patents, enable producing radially extending ports or other complex configurations, each process requires a step of joining the subcomponents to form the final article. Thus, while eliminating many machining steps these disclosed processes still require assembly or joining steps which prevent a sizable reduction in the cost of the article.

SUMMARY OF THE INVENTION

The present invention is directed to the structure of an article such as a collar having a setscrew hole which structure enables the fabrication of the entire article in a simple molding process without requiring additional steps of drilling and tapping to form the setscrew hole which receives a setscrew for securing the article on a member. Preferably, the article is formed in the desired configuration by compacting metal powders and is subsequently sintered. The structure of the article provides an opening for receiving a member, a second opening extending at an angle thereto which second opening has partial annular segments which are provided with threads and which coact to provide interrupted threads for the second opening. Preferably, each of the partial segments is on an end wall of a cavity extending axially towards a surface of the body with adjacent cavities extending in opposite directions and over lapping each other at the end walls so that a threaded elements can be threadably received in the second opening.

DESCRIPTION OF THE PREFERRED EMBODIMENT

The principles of the present invention are particularly useful in an article such as a collar 10 which is telescopically received on a member such as a shaft 11 and detachably secured on the shaft 11 by a setscrew 12 to maintain the shaft 11 and a second structure 13 in the desired position or relationship. The structure 13 can be any article such as a roll which is rotatably supplied on the shaft 11 or it can be a portion of a frame or supporting structure for supporting the shaft in which case the collar 10 is utilized for maintaining the shaft in the desired axial position in the supporting structure.

Figure 1:
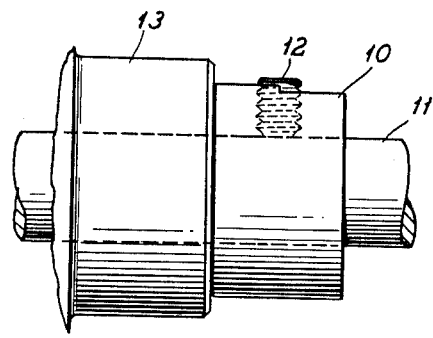
FIG. 1 is a side elevation of the article of the present invention utilized for positioning another element on a shaft.
Figure 2:
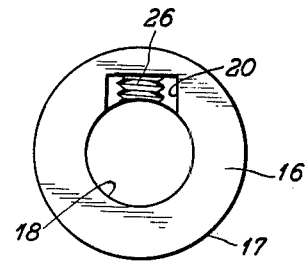
FIG. 2 is a view of one end of the article of the present invention.
Figure 3:
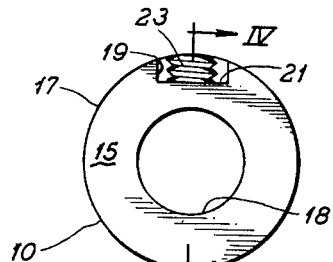
FIG. 3 is a view of the other end of the article of the present invention.
Figure 4:
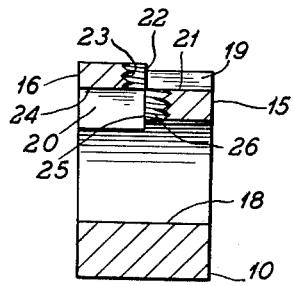
FIG. 4 is a cross section of the article of the present invention taken along lines IV—IV of FIG. 3.
Figure 5:
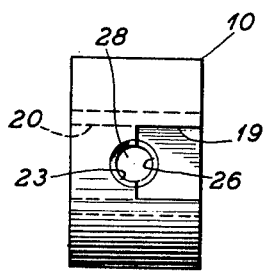
FIG. 5 is a top view of the article of the present invention.

As illustrated in FIG. 2, 3, and 4, the article 10 is a one-piece body with a pair of end surfaces 15 and 16 and an outer surface 17 which is illustrated as being a cylindrical surface. However, the outer surface 17 of the collar can have any desired configuration.

The article 10 has a first opening 18 which extends inwardly from one of the end surfaces 15 and 16 and preferably extends completely through the one-piece body. The opening 18 can be a cylindrical opening, as illustrated, or if desired can have any configuration for being received telescopically on a member having an exterior surface other than a cylindrical surface.

The article has a pair of cavities 19 and 20 which extend inwardly from each of the end surfaces 15 and 16. The cavity 19, as illustrated, is in communication with the outer surface 17 and the cavity 20 is in communication with the first opening 18. The cavity 19 has a bottom wall 21 and an end wall 22 a portion of which has a semi-circular depression 23 to form a partial annular segment with threads extending through an arc of approximately 180°. In a similar manner, the cavity 20 has a bottom wall 24 and terminates in an end wall 25 which has a portion forming a partial annular segment 26, which has threads. The cavities 19 and 20 are radially offset from an axis of the opening 18 so that the bottom walls 21 and 24 are on substantially the same plane. Each of the cavities 19 and 20 have a length and they extend inwardly from the end surface 15 and 16, respectively, so that the end walls 22 and 25 are on substantially the same plane with the segments 23 and 26 over lapping and coacting to define a second opening 28 which has an axis lying in the plane defined by the end walls 22 and 25. The offset and facing orientation of the segments 23 and 26 provides the opening 28 with interrupted or discontinuous threads for threadably receiving a threaded element.

When using the collar or the article 10, a setscrew such as 12 is threadably received in the second opening 28, which preferably extends substantially perpendicular to the axis of the opening 18. The setscrew 12 can be any standard setscrew which when tightened will hold the collar or article 10 in the desired position on the shaft 11.

The collar 10 is preferably formed by a method utilizing a minimum number of forming steps. The preferred method utilizes powder metal technology in which metal powders are pressed into the configuration of the collar with the axis of the setscrew opening 28 formed by the segments 23 and 26 extending transversely to the direction of pressing to enable the complete compacting of the powder into the article in a single pressing operation. Subsequent to the pressing of the powder into a green compact, the operation is completed by sintering the green compact. If desired, the sintered compact is then subjected to a coining operation.

Figure 6:
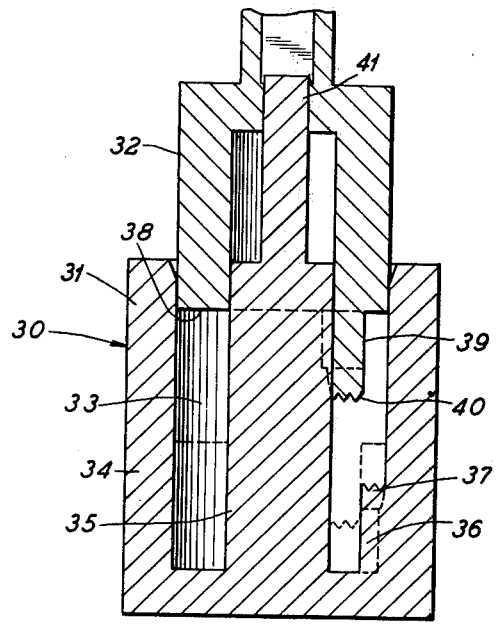
FIG. 6 is a cross-sectional view of a die arrangement which can be utilized in the method of forming the article of the present invention.

An example of a die which can be utilized in the method is generally indicated at 30 in FIG. 6. The die 30 consists of two relatively movable parts 31 and 32. The part 31 has a substantially annular cavity 33 formed by a continuous side wall 34 and a center member 35. To form the cavity such as at 19 with the threaded portions 23 as the powder is compacted, a projection 36 extends into the annular cavity 33 along the side wall 34 and is provided with an end portion 37 of the desired configuration to form the threaded segment 23. The part 32 has an annular compacting surface 38 with a projection 39 which has an end portion 40 to form the threaded annular segment 26 as the projection 38 forms cavity 20. The part 32 is slidably received in the part 31, and, as illustrated, is connected with a spline connection 41 to prevent relative rotation therebetween.

To utilize a die during the compacting process, the cavity 33 is charged or filled with the metal powders and then pressure is applied to force the part 32 into the annular cavity 33 for compacting the powders to substantially the final configuration of the collar or article 10 which final configuration is obtained when part 32 assumes the position illustrated in broken lines. After completion of pressing the powder into a green compact, the part 32 is withdrawn to enable removal of the green compact for a subsequent sintering step. If desired, the sintered article can be coined by a conventional coining process in the same die or a similar die to size the article. To facilitate stripping of the green compact from the die cavity 33, the die member may be subdivided into several movable parts. Thus is should be understood that the die 30 is only an example of a die which can be used to press the powder into a green compact.

Due to the provision of the cavities 19 and 20 adjacent the segment 23 and 26 and due to the position of the threads with respect to the pressing direction, the single body article can be produced from powder metal by a simple compacting process which is followed by a sintering operation. The cavities 19 and 20 enable pressure to be applied on the metal powder to form the threaded segment without requiring expensive machining operations such as drilling and tapping.

While the preferred method of forming the article or collar 10 is by compacting metal powders, the collar can also be formed by molding a plastic material in a molding chamber having forming surfaces providing the desired configuration. After the material is molded, some or all of the molding surfaces are withdrawn to enable removal or stripping of the one-piece body of the article 10. For example, the article can be formed in a mold similar to die 30 which mold is capable of applying heat and pressure on a plastic powder to cause conglomeration of the powder into the article which is subsequently stripped from the mold after some of the forming surfaces are withdrawn.

Other articles having a setscrew can be formed from metal powders or plastic material by the method of the present invention. For example gears having a hub with a setscrew can be provided with a hub configuration of article 10 and can be produced by the method of the present invention.

Although various minor modifications may be suggested by those versed in the art, it is understood that I wish to include within the scope of the patent granted hereon all such modifications that reasonably and properly come within my contribution to the art.

I claim:

1. A method for forming a one-piece article having a first opening extending inwardly from an end surface and second opening extending from the first opening at an angle thereto, said second opening being defined by a plurality of threaded segments of a partial annular configuration, said segments being axially offset to each other along an axis of the second opening and coacting to provide the second opening with interrupted threads, each of said segments being on an end wall of a cavity extending axially towards an end surface of the body with adjacent cavities extending in opposite directions, the method comprising providing a plurality of forming surfaces movable into the configuration of the article, molding material with the forming surfaces to form the article in a single molding step, and subsequently retracting some of the forming surfaces to enable removal of the method article from the forming surfaces.

2. A method according to claim 1 wherein the forming surfaces are in a die for compacting metal powder, and said step of molding includes introducing powder in the die, and applying pressure to move the forming surfaces relative to each other to compact the powder to the configuration of the article with the interrupted threads of the annular segments extending on an axis that is transverse to the direction of application of the pressure during compacting and which further includes the step of subsequently sintering the compacted article after removal from the forming surface to produce the one-piece article.

3. Method according to claim 1, wherein the plurality of forming surfaces form a closed configuration of a compacting die and wherein the step of molding includes the steps of introducing the material, applying heat and pressure to compact the material and to cause conglomeration thereof, said step of applying pressure applies pressure along a predetermined direction with the threads of the partial annular segments extending in a direction transversely thereto.

4. A method according to claim 1, wherein the step of molding is accomplished by compacting and sintering powder metal with the sintering being accomplished on the compacted metal article subsequent to removal from a die formed by the forming surfaces.

* * * * *